United States Patent
Bates et al.

(10) Patent No.: US 6,839,893 B2
(45) Date of Patent: Jan. 4, 2005

(54) DEBUGGER CAPABLE OF PROVIDING WARNINGS FOR UNREACHABLE BREAKPOINTS

(75) Inventors: Cary Lee Bates, Rochester, MN (US); John Matthew Santosuosso, Rochester, MN (US); William Jon Schmidt, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 572 days.

(21) Appl. No.: 09/982,393

(22) Filed: Oct. 18, 2001

(65) Prior Publication Data

US 2003/0079206 A1 Apr. 24, 2003

(51) Int. Cl.[7] .................................................. G06F 9/44
(52) U.S. Cl. ......................................... 717/124; 714/37
(58) Field of Search ................................ 717/124–133, 717/140–143; 714/38, 34, 37, 45

(56) References Cited

U.S. PATENT DOCUMENTS 6,145,123 A * 11/2000 Torrey et al. ............... 717/128
6,249,907 B1 * 6/2001 Carter et al. ................ 717/129
6,282,701 B1 * 8/2001 Wygodny et al. ........... 717/125
6,434,741 B1 * 8/2002 Mirani et al. ............... 717/124
6,571,387 B1 * 5/2003 Chow et al. ................ 717/156
6,748,583 B2 * 6/2004 Aizenbud-Reshef et al. ..... 717/127

OTHER PUBLICATIONS

"Breakpoint", Http://web.archive.org/web/20020817044203/http://www.mecanique.co.uk/code . . . , □□2001.*

"Coverability Analysis Using Symbolic Model Checking". NNRD40875. Mar., 1998.*

* cited by examiner

*Primary Examiner*—Wei Y. Zhen
(74) *Attorney, Agent, or Firm*—Dillon & Yudell LLP

(57) ABSTRACT

A debugger capable of providing warnings for unreachable breakpoints is disclosed. After a breakpoint has been set by a user, within an application program source code that is monitored by a debugger, a debugger determines whether or not the breakpoint is set on a statement listed in an unreachable statement list. If the breakpoint is set on a statement listed in an unreachable statement list, the debugger displays an unreachable breakpoint warning to the user.

14 Claims, 5 Drawing Sheets

| UNREACHABLE STATEMENT COLUMN | CAUSE STATEMENT COLUMN |
|---|---|
|  |  |
|  |  |
|  |  |
|  |  |
| ⋮ | ⋮ |

DEBUGGER CAPABLE OF PROVIDING WARNINGS FOR UNREACHABLE BREAKPOINTS

BACKGROUND OF THE INVENTION

1. Technical Field

The present invention relates to software development in general, and in particular to a software debugger. Still more particularly, the present invention relates to a software debugger capable of providing warnings for unreachable breakpoints.

2. Description of the Prior Art

The process of eliminating errors during software development is commonly known as debugging. Debugging can be quite costly and time consuming, depending on the complexity of the software being developed. Accordingly, software tools, such as debuggers, have been developed for reducing debugging cycle time. Debuggers typically execute as self-contained processes for controlling an application program under study through operating system primitives designed for that purpose.

An application program usually includes data and functions that operate on those data. The data and functions are defined in a source file. A tool called a compiler reads the source file and produces an object file. The compiler typically works in conjunction with other tools, such as an assembler, a linker and an optimizer, to accomplish this task. The object file contains bits that can be loaded into a computer memory to be executed. After having been loaded into the computer memory, the bits are called a program image. The object file also contains a symbol table that maps some of the original source information, such as variable and function names, onto addresses, offsets, sizes, and other pertinent properties of the program image. Quite often, the symbol table is not made part of the program image itself, but remains in the object file where other programs, such as the debugger, can read and analyze it.

A debugger can be used to examine the program image of a program in its execution state. Because the debugger has access to the symbol table, it allows a programmer to interact with the target process in terms of the names found in the source file. By going to the symbol table and looking up the variable's address and type, the debugger obtains the information it needs to satisfy the request from the programmer.

Debuggers are most often used to intercept or monitor the thread of control through a running program. It is usually the case that one or the other of the debugger or the target program is in control, but not both. If the target program is running, the user can interact directly with the target program while the debugger lies dormant. If the debugger is running, the programmer has the attention of the debugger and the target program is usually stopped (i.e., its program counter advances no further). When the debugger is running, it is said to be in control; when the debugger causes the target program to begin (or resume) execution, the debugger relinquishes control.

The debugger will regain control after the target program counter reaches a pre-determined address. The debugger can deposit a machine instruction at that address, designed to cause some trap or to cause an operating system service to be called when it is executed. By virtue of prior arrangements between the debugger and the operating system, two things happen when the target program reaches one of those instructions: 1) the execution of the target program is put aside or stopped, and 2) the debugger is notified of the event and re-gains control. The debugger is able to determine the location of the event by examining program image state information saved by the operating system. Such special instructions, or the loci of such instructions, are called breakpoints. Breakpoints are usually set at the direction of the programmer, who may want to know if and when execution reaches a certain point in an application program, and may further desire to examine certain state information after the breakpoint has been triggered.

The programmer specifies where in the application program a breakpoint should be inserted. The programmer may inadvertently set a breakpoint at a location where the application program does not reach. In response to such a situation, the programmer typically examines the inputs of the application program he/she is debugging and tries to modify the inputs before rerunning the application program in an attempt to hit the breakpoint. But such attempt is often futile. Consequently, it is desirable to provide a debugger that is capable of notifying a programmer that he/she has set a breakpoint at a location where an application program will not reach.

SUMMARY OF THE INVENTION

In accordance with a preferred embodiment of the present invention, after a breakpoint has been set by a user, within an application program source code that is monitored by a debugger, a debugger determines whether or not the breakpoint is set on a statement listed in an unreachable statement list. If the breakpoint is set on a statement listed in an unreachable statement list, the debugger displays an unreachable breakpoint warning to the user.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
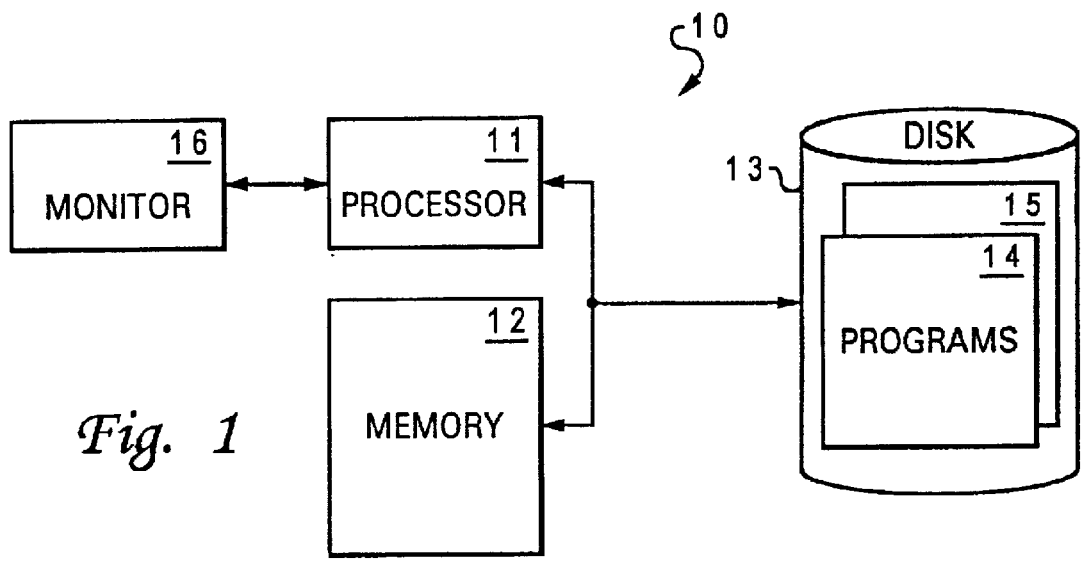
FIG. 1 is a block diagram of a data processing system in which a preferred embodiment of the present invention is applicable.

Referring now to the drawings and in particular to FIG. 1, there is depicted a block diagram of a data processing system in which a preferred embodiment of the present invention is applicable. As shown, a data processing system 10 includes a processor 11, a memory 12, a hard disk 13, and a monitor 16. Programs 14 are preferably stored within hard disk 13 until programs 14 are needed for execution, at which time programs 14 are brought into memory 12 so that programs 14 can be directly accessed by processor 11. Processor 11 selects a part of memory 12 to read and/or write by using an address processor 11 gives to memory 12 along with a request to read and/or write. Usually, the reading and interpretation of an encoded instruction at an address causes processor 11 to fetch a subsequent instruction, either at a subsequent address or some other address. Hard disk 13 stores the bits that represent executable program steps (i.e., program image) as well as a symbol table 15 for each program that ties its bits back to the information that are in the source code. Symbol table 15 is used, usually by programs such as linkers or debuggers, to interpret variable or function names as addresses in the executable program. The columns of symbol table 15 preferably include:

1. NAME: For a variable, it is the name of the variable, either per se or with some simple encoding done by the compiler. For a function, it is a name in which the function signature has been encoded by the compiler. For a type, particularly for a structure definition, it is the corresponding type or structure name.
2. TYPE: This indicates the primitive type, or derived type, as appropriate, for the entity named in the NAME column.
3. CLASS: This is a basic designation of what the entry represents: a function, a structure, a structure member, a local variable, etc.
4. ADDRESS: The address, or offset, as appropriate, of the symbol is defined in this entry. For types, which in and of themselves take no storage, the size is given in this field.
5. LINK: A pointer to an associated "parent" entry in the symbol table. For example, all structure members "point" to their structure declaration entry.

To learn about the behavior of an application program, it is often instructive to monitor its progress during execution. Such can be done by arranging for the application program to stop at certain prearranged points in its sequence of steps, at which time data contents in various addresses within memory 12 can be examined. Those prearranged points are typically known as breakpoints. A succession of arrivals at different breakpoints gives a programmer a feel for the flow of the application program as well as the data contents and intermediate results at those breakpoints.

Figure 2:
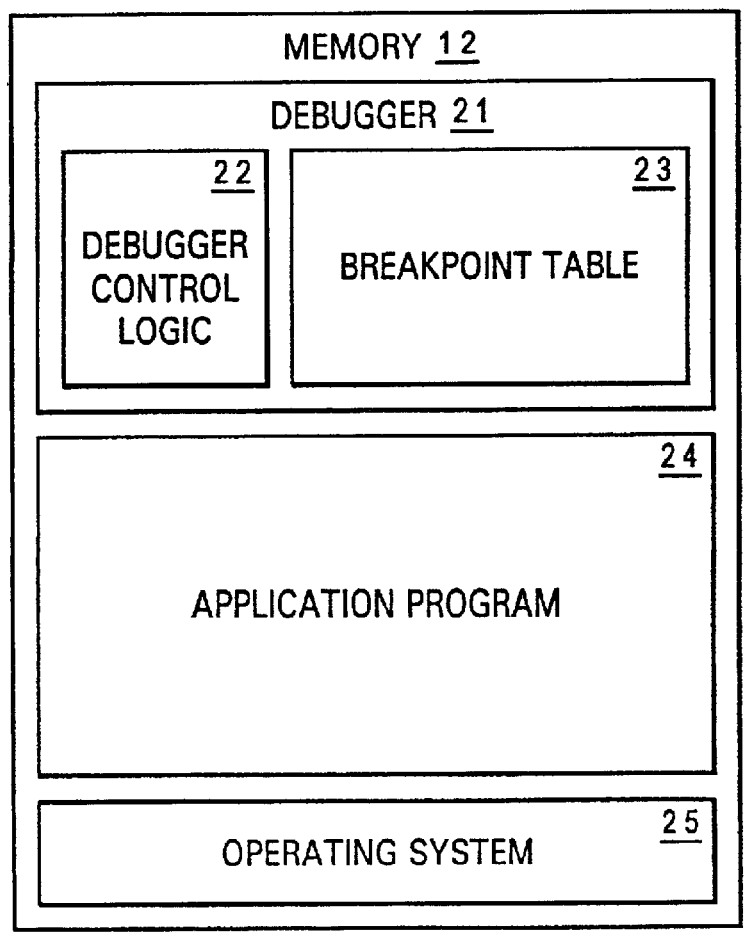
FIG. 2 is a block diagram of the contents within a memory of the data processing system from FIG. 1, in accordance with a preferred embodiment of the present invention.

With reference now to FIG. 2, there is illustrated a block diagram of the contents within memory 12 from FIG. 1, in accordance with a preferred embodiment of the present invention. As shown, memory 12 includes a debugger 21, an application program 24, and an operating system 25. Application program 24 is controlled and observed by debugger 21. Debugger 21 contains a debugger control logic 22 and a breakpoint table 23. Debugger control logic 22 includes sequences of instructions for controlling the behavior of debugger 21. Breakpoint table 23 includes an entry for each of the breakpoints that have been inserted in application program 24. Breakpoint table 23 also contains information that allows each breakpoint to be interpreted in a number of ways, depending on the context of application program 24 when the breakpoint is reached.

Figures 3, 4A:
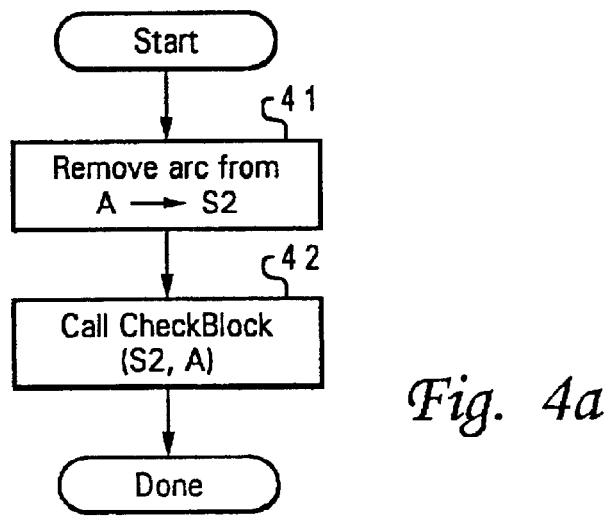
FIG. 3 is a diagram of an unreachable statement list in accordance with a preferred embodiment of the present invention.
FIGS. 4a–4c are high-level flow diagrams of a method for generating unreachable statement information for the unreachable statement list from FIG. 3, in accordance with a preferred embodiment of the present invention.

Referring now to FIG. 3, there is illustrated a diagram of an unreachable statement list in accordance with a preferred embodiment of the present invention. As shown, an unreachable statement list 30 has two columns, namely, an unreachable statement column 31 and a cause statement column 32.

As its name implies, each entry of unreachable statement column 31 contains a line number of an unreachable statement within an application program; and the line number of the corresponding statement that causes the unreachable statement is listed in the adjacent column of the same row in cause statement column 32.

Unreachable statement list 30 is preferably built by a compiler and is associated with the debugger data within debugger 21 (from FIG. 2), as follows. After the compiler has built up a number of data structures commonly used in optimizing compilers, the compiler then divides its internal representation of the current procedure's code into multiple basic blocks. A basic block is defined as a maximal sequence of straight-line code, which means if the first statement in a basic block is executed, then the last statement in that block will also be executed. A basic block is maximal in the sense that no statement before or after the block can be added to the block and can still be satisfying the rules of what constitutes a basic block. Flow of control can enter a basic block only at the top of the basic block, and can leave a basic block only at the end.

Subsequently, the compiler generates a graph known as a control flow graph (CFG). A CFG contains one node for each basic block in the application program being compiled. Within the CFG, an arc is formed from a node that represents block A to a node that represents block B if and only if it is possible for control to flow directly from block A to block B, meaning the statements of block B can be executed immediately after the statements of block A.

The compiler next assigns a depth-first order number dfn[B] to block B when block B, satisfying the property that dfn[A] <dfn[B] if block A must be executed for the first time before block B is executed for the first time. An exemplary algorithm for assigning depth-first order numbers is Algorithm 10.14 depicted in Section 10.9 of Aho, Sethi and Ullman, *Compilers: Principles Techniques, and Tools*, Addison-Wesley Publishing Company, Reading, Mass., 1986, which is incorporated herein by reference.

Finally, the compiler builds up an internal representation of the looping structure of the code. A loop is an informal name for a strongly connected component (SCC) within a CFG. An SCC is a set of blocks that satisfied the following requirement: for any two blocks A and B in a given set, there is a direct path in the CFG from block A to block B as well as a direct path from block B to block A. A block can be a member of more than one SCC, but those SCCs must always be properly nested (i.e., one fully contains the other). Another name for a SCC is a region. If a region has only one block with predecessors outside the region (i.e., only one entry block), it is called a proper region. If a region has multiple entry blocks, it is called an improper region. An exemplary algorithm for finding strongly connected components is depicted in FIG. 7.26 of Section 7.4 of S. S. Muchnik, *Advanced Compiler Design and Implementation*, Morgan Kaufmann Publishers, San Francisco, 1997, which is incorporated herein by reference.

A common optimization during compilation is to detect that a conditional branch (such as "if x>0 goto S") has as its condition one that will either always be satisfied, or never be satisfied. If such is the case, the conditional branch can be replaced by an unconditional branch (such as "goto S"). The original branch would be in a basic block B having (at least) two successors: block T to be executed if the condition is true, and block F to be executed if the condition is false. There would be an arc in the CFG pointing from block B to block T, and a second arc pointing from block B to block F. If the branch is replaced by "goto T," then the arc pointing from block B to block F can be removed. Contrarily, if the branch is replaced by "goto F," then the arc pointing from block B to block T would be removed. When an arc is removed, it is possible that the target block of that arc can no longer be executed; in other words, the statements within the target block have become "unreachable." For each unreachable statement, an entry is added to unreachable statement list 30, with the line number of the unreachable statement appearing in unreachable statement column 31 and the line number of the formerly conditional branch statement appearing in cause statement column 32.

A conditional branch statement, BranchStmt, that has been converted to an unconditional branch can be used as an example to illustrate how to obtain the unreachable statement information and how such information is entered into unreachable statement list 30. Assuming BranchStmt resides in block A, and BranchStmt has two successors S1 and S2. After the conversion, the unconditional branch targets successor S1, and successor S2 becomes unreachable from BranchStmt. With reference now to FIG. 4a, there is depicted a high-level logic flow diagram of a method for generating unreachable statement information for unreachable statement list 30, in accordance with a preferred embodiment of the present invention. First, an arc from block A pointing to successor S2 (i.e., A→S2) is removed from the CFG, as shown in block 41. Subsequently, a function call named CheckBlock(Block,CauseStmt) is invoked with S2 and A as inputs, as depicted in block 42.

Figure 4B:
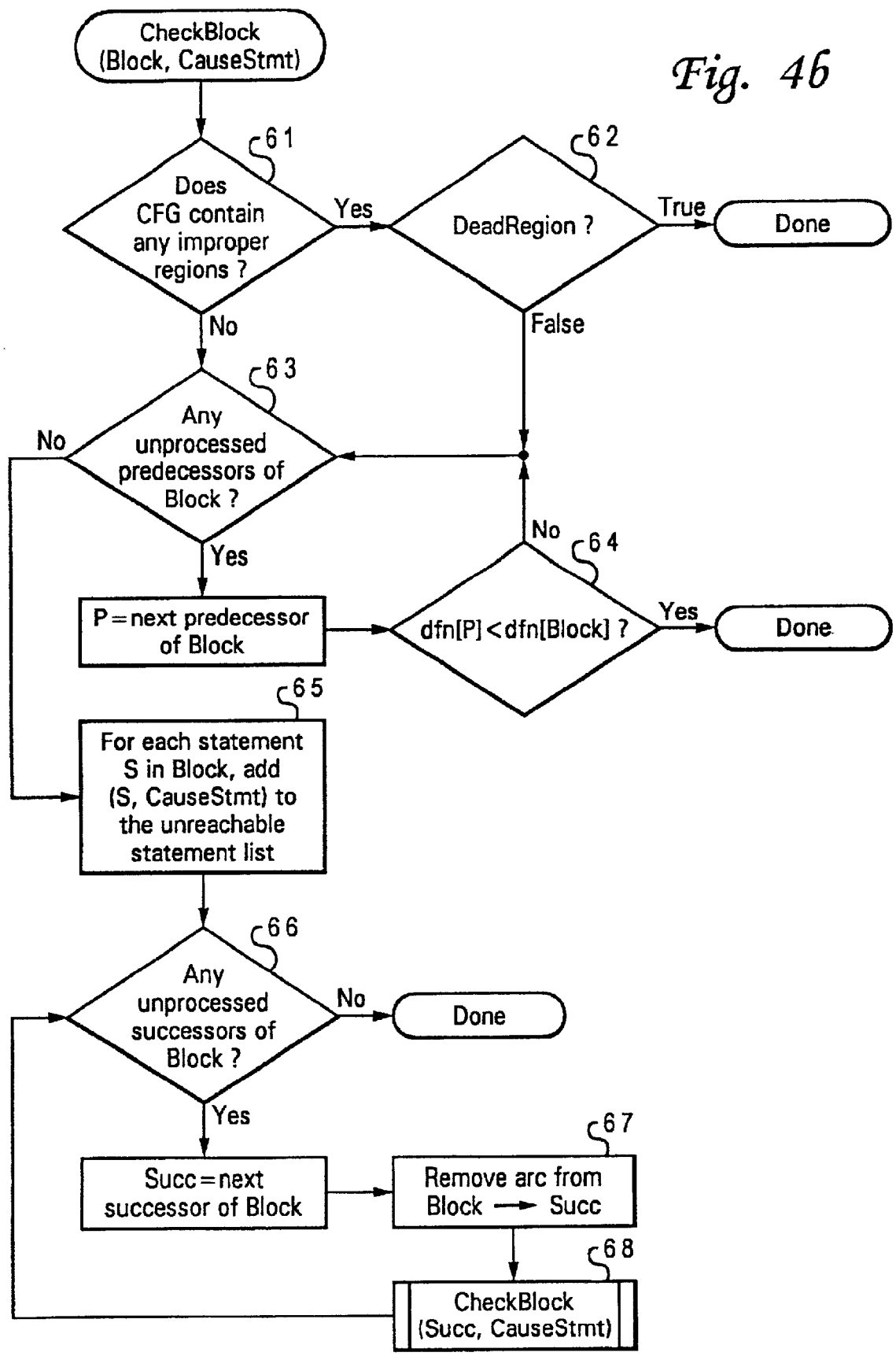

With reference now to FIG. 4b, there is illustrated a high-level logic flow diagram of the function call CheckBlock(Block,CauseStmt), in accordance with a preferred embodiment of the present invention. As shown, a determination is made as to whether or not the CFG contains any improper regions, as depicted in block 61. If the CFG contains an improper region, another determination is made as to whether or not a dead region is contained within the improper region, as illustrated in block 62. A function call named CheckRegions( ) for determining whether or not an unreachable region is contained within an improper region will be further described in FIG. 4c. If the improper region contains an unreachable region, the process is complete. Note that the function call CheckRegions( ) returns a value DeadRegion, which has a logical value of TRUE if the function call CheckRegions( ) detected that Block is contained in an unreachable region, and a logical value of FALSE is returned otherwise.

Otherwise, if the improper region does not contain a dead region or if the CFG does not contain any improper region, a determination is made as to whether or not a basic block has a predecessor, as shown in block 63. If the basic block, such as block A, has a predecessor, another determination is made as to whether or not the predecessor has a depth-first order number smaller than block A has, as depicted in FIG. 64. If the predecessor has a depth-first order number smaller than block A, then block A is still reachable and the process is complete. Otherwise, if the predecessor does not have a depth-first order number smaller than block A, then block A is contained in a loop that has become unreachable from outside the loop, and all statements within block A are added to unreachable statement list 30 (from FIG. 3) with a cause statement placed in a corresponding cause statement column 32 within unreachable statement list 30, as illustrated in block 65.

Afterwards, if block A is determined to have any successors, as shown in block 66, another loop is entered to consider all successors of block A in the CFG. In such loop, the arcs from block A to each successor Succ are first removed, as depicted in block 67. Then, the function call CheckBlock( ) is invoked again recursively to check if each successor Succ is unreachable, as shown in block 68.

Figure 4C:
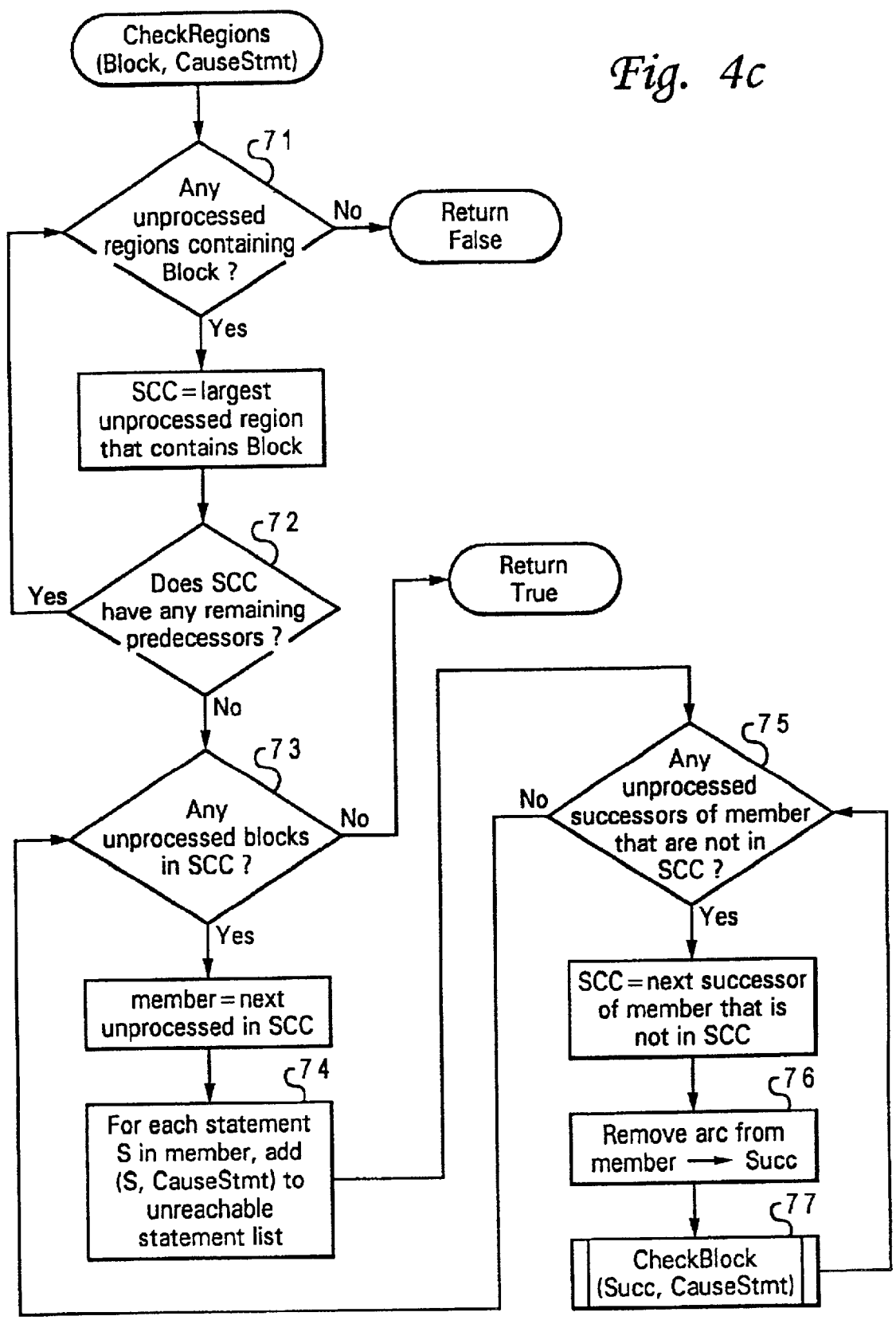

With reference now to FIG. 4c, there is illustrated a high-level logic flow diagram of the function call CheckRegions( ), in accordance with a preferred embodiment of the present invention. A determination is made as to whether a Block, such as block A, is contained in any regions, as shown in block 71. If not, the function returns a logical FALSE value and exits. Otherwise, the regions containing block A are processed from outermost to innermost, with the variable SCC representing the region currently being considered. Region SCC is examined to see if there are any control flow arcs remaining that enter the region, as depicted in block 72. If so, then the next outermost region is considered. Otherwise, the arc that was just removed must have been the last entry arc to the region, so the entire region (and any regions it contains) has become unreachable. Next, a loop is performed that processes each block Member within region SCC. All of the statements in block Member are added to unreachable statement list 30 (from FIG. 3), with CauseStmt in cause statement column 32, as depicted in block 74. Next, the CFG is examined to see if there are any successors of block Member that are not contained in region SCC, as shown in block 75. Each such successor Succ is processed, with the arc from block member to successor Succ removed from the CFG, as shown in block 76, and the function call CheckBlock( ) is invoked recursively to see if successor Succ has now become unreachable, as depicted in block 77. After all successors of all Blocks in SCC have been processed in this fashion, the function returns a logical TRUE and exits.

After unreachable statement list 30 has been filled with the appropriate unreachable statement information related to the application program, a debugger, such as debugger 21 from FIG. 2, can utilize information from unreachable statement column 31 of unreachable statement list 30 to determine whether or not a breakpoint is set in the application program code that the compiler has determined to be unreachable. If so, the debugger then warns the programmer that the breakpoint has been set in an unreachable portion of the application program code, and unless the breakpoint and/or the program variables within the debugger are modified, the breakpoint set by the programmer will not be reached. As an additional aid to the programmer, the debugger can utilize the information from cause statement column 32 of unreachable statement list 30 to highlight a statement in a monitor window within which the application program code is displayed, along with a message indicating this statement is responsible for the breakpoint being unreachable.

Figure 5:
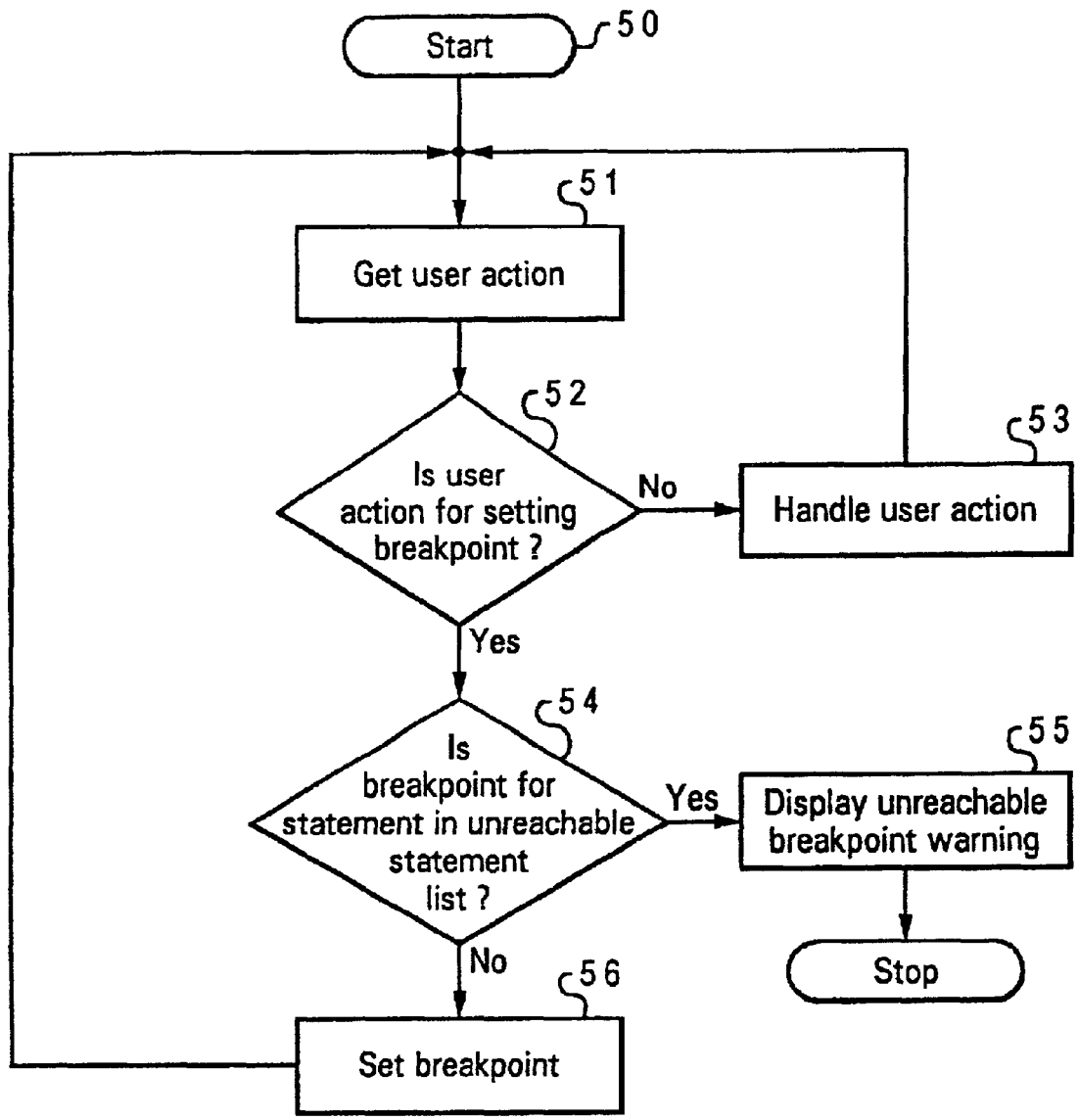
FIG. 5 is a high-level logic flow diagram of a method for providing warnings for unreachable breakpoints within a debugger, in accordance with a preferred embodiment of the present invention.

Referring now to FIG. 5, there is depicted a high-level logic flow diagram of a method for providing warnings for unreachable breakpoints within a debugger, in accordance with a preferred embodiment of the present invention. Starting at block 50, the debugger begins to receive an action desired by a user, as shown in block 51. A determination is made as to whether or not the action is for setting a breakpoint, as depicted in block 52. If the action is not for setting a breakpoint, the debugger handles the action in a typical fashion as it is known in the art, as illustrated in block 53. If the action is for setting a breakpoint, another determination is made as to whether or not the breakpoint is set on a statement listed on an unreachable statement list (such as unreachable statement list 30 from FIG. 3), as shown in block 54. If the breakpoint is set on a statement listed on the unreachable statement list, an unreachable breakpoint warning is displayed to the user on a computer monitor (such as monitor 16 from FIG. 1), as depicted in block 55. In addition, the cause statement for the unreachable statement can also be highlighted, if such function is desired by the user. Otherwise, if the breakpoint is not set on a statement listed on the unreachable statement list, the breakpoint is set, as depicted in block 56.

As has been described, the present invention provides a debugger capable of providing warnings for unreachable breakpoints set by a programmer. It is important to note that although the present invention has been described in the context of a fully functional data processing system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for providing warnings for unreachable breakpoints by a debugger, said method comprising:

in response to a breakpoint set by a user, wherein said breakpoint is set within an application program source code monitored by said debugger, determining whether or not said breakpoint is set on a statement listed in an unreachable statement list; and in response to a determination that said breakpoint is set on a statement listed in an unreachable statement list, displaying an unreachable breakpoint warning to said user by said debugger.

2. The method of claim 1, wherein said displaying step further includes highlighting a cause statement associated with said unreachable breakpoint by said debugger.

3. The method of claim 1, wherein said unreachable statement list further includes at least one unreachable statement entry.

4. The method of claim 3, wherein said at least one unreachable statement entry is associated with a cause statement entry.

5. The method of claim 1, wherein said unreachable statement list is generated by a CheckBlock( ) function call.

6. A computer program product residing on a computer usable medium for providing warnings for unreachable breakpoints in a debugger, said computer program product comprising:

program code means for determining whether or not a breakpoint is set on a statement listed in an unreachable statement list, in response to said breakpoint set by a user, wherein said breakpoint is set within an application program source code monitored by said debugger; and program code means for displaying an unreachable breakpoint warning to said user by said debugger, in response to a determination that said breakpoint is set on a statement listed in an unreachable statement list.

7. The computer program product of claim 6, wherein said program code means for displaying further includes program code means for highlighting a cause statement associated with said unreachable breakpoint by said debugger.

8. The computer program product of claim 6, wherein said unreachable statement list further includes at least one unreachable statement entry.

9. The computer program product of claim 8, wherein said at least one unreachable statement entry is associated with a cause statement entry.

10. The computer program product of claim 6, wherein said unreachable statement list is generated by a CheckBlock( ) function call.

11. A computer system having a debugger capable of providing warnings for unreachable breakpoints, said computer system comprising:

a processor;

a monitor coupled to said processor; and a memory coupled to said processor, wherein said memory includes means for determining whether or not a breakpoint is set on a statement listed in an unreachable statement list, in response to said breakpoint set by a user, wherein said breakpoint is set within an application program source code monitored by said debugger; and means for displaying an unreachable breakpoint warning on said monitor to said user by said debugger, in response to a determination that said breakpoint is set on a statement listed in an unreachable statement list.

12. The computer system of claim 11, wherein said means for displaying further includes means for highlighting a cause statement associated with said unreachable breakpoint by said debugger.

13. The computer system of claim 11, wherein said unreachable statement list further includes at least one unreachable statement entry.

14. The computer system of claim 13, wherein said at least one unreachable statement entry is associated with a cause statement entry.

* * * * *